United States Patent
Liu et al.

(10) Patent No.: US 9,338,689 B2
(45) Date of Patent: May 10, 2016

(54) METHOD FOR MOBILE TERMINAL TO ACCESS WIRELESS ACCESS POINT AND WIRELESS ACCESS POINT

(75) Inventors: Xiang Liu, Shenzhen (CN); Minghao Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 25 days.

(21) Appl. No.: 14/398,560

(22) PCT Filed: Jun. 25, 2012

(86) PCT No.: PCT/CN2012/077447
§ 371 (c)(1),
(2), (4) Date: Nov. 3, 2014

(87) PCT Pub. No.: WO2013/163842
PCT Pub. Date: Nov. 7, 2013

(65) Prior Publication Data
US 2015/0109912 A1  Apr. 23, 2015

(30) Foreign Application Priority Data
May 4, 2012 (CN) .......................... 2012 1 0137594

(51) Int. Cl.
*H04W 28/02* (2009.01)
*H04W 28/08* (2009.01)
*H04W 48/06* (2009.01)
(Continued)

(52) U.S. Cl.
CPC .......... *H04W 28/0289* (2013.01); *H04W 12/04* (2013.01); *H04W 28/0205* (2013.01); *H04W 28/08* (2013.01); *H04W 48/06* (2013.01); *H04W 48/14* (2013.01); *H04W 88/08* (2013.01)

(58) Field of Classification Search
None
See application file for complete search history.

(56) References Cited

U.S. PATENT DOCUMENTS

| 2004/0054798 A1 | 3/2004 | Frank et al. |
| 2005/0281205 A1* | 12/2005 | Chandwadkar ..... H04L 12/5695 370/249 |

(Continued)

FOREIGN PATENT DOCUMENTS

| CN | 101902822 A | 12/2010 |
| CN | 102149136 A | 8/2011 |

(Continued)

OTHER PUBLICATIONS

International Search Report of PCT/CN2012/077447, dated Feb. 28, 2013.

*Primary Examiner* — Hong Cho
(74) *Attorney, Agent, or Firm* — Banner & Witcoff, Ltd.

(57) ABSTRACT

A method for a mobile terminal accessing wireless access points and a wireless access point are disclosed. The method includes: after acquiring an access request of a mobile station, when determining that its load exceeds a preset first load upper limit, according to acquired connection information of other wireless access points, a first wireless access point sends a load balance request to all the other wireless access points; a wireless access point receiving the request sends a load balance feedback message to the first wireless access point, carrying its load and connection authentication information required; the first wireless access point selects a load balance feedback message carrying a minimum load from all received messages, and then sends the connection authentication information carried in the selected message to the mobile station; and the mobile station initiates an access flow to a corresponding wireless access point according to the received information.

20 Claims, 4 Drawing Sheets

(51) Int. Cl.
*H04W 48/14* (2009.01)
*H04W 12/04* (2009.01)
*H04W 88/08* (2009.01)

(56) References Cited

U.S. PATENT DOCUMENTS

2006/0239207 A1* 10/2006 Naghian ............... H04L 45/125
 370/254
2011/0164504 A1* 7/2011 Bothos ................. H04L 47/125
 370/237
2012/0020215 A1* 1/2012 Lai ...................... H04L 43/0817
 370/235
2013/0028246 A1* 1/2013 Gonikberg ............ H04W 64/00
 370/338

FOREIGN PATENT DOCUMENTS

| CN | 102378260 A | 3/2012 |
| EP | 2273820 A1 | 1/2011 |
| KR | 20120025102 A | 3/2012 |
| WO | 2011030836 A1 | 3/2011 |

* cited by examiner

METHOD FOR MOBILE TERMINAL TO ACCESS WIRELESS ACCESS POINT AND WIRELESS ACCESS POINT

TECHNICAL FIELD

The present document relates to the field of mobile terminal applications, and particularly, to a method for a mobile terminal accessing wireless access points and a wireless access point.

BACKGROUND OF THE RELATED ART

A Wireless Local Area Network (WLAN) is a wireless data network, a local area network is constructed in a wireless way, and data are sent and received in the air with electromagnetic waves but without cable mediums. The WLAN is a supplement and extension to the wired networking way, which makes computers in the network have a mobility, thereby solving the network connection problem of difficult implementation in the wired way rapidly and conveniently.

At present, devices such as a computer with a wireless network card and a mobile phone supporting Wireless Fidelity (Wi-Fi) serving as a client and so on can be collectively called mobile terminals, that is, the mobile terminals include terminal devices such as mobile phones supporting Wi-Fi and computers with wireless network cards, these mobile terminal all play a role of Station (STA) in the wireless local area network, and thus the mobile terminals are collectively called STAs below for an easy description.

Figure 1:
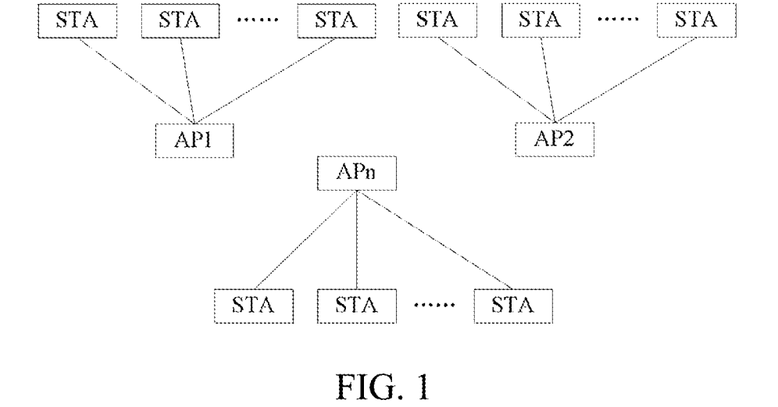
FIG. 1 is a schematic diagram of a WLAN networking structure in the related art.

As shown in FIG. 1, the WLAN includes STAs and Access Points (called APs for short), wherein each AP (such as an AP1, an AP2, . . . APn) notifies the STAs around the present AP by constantly sending Beacon messages, which enables the STAs to search out the present AP and then initiate an association request.

Figure 2:
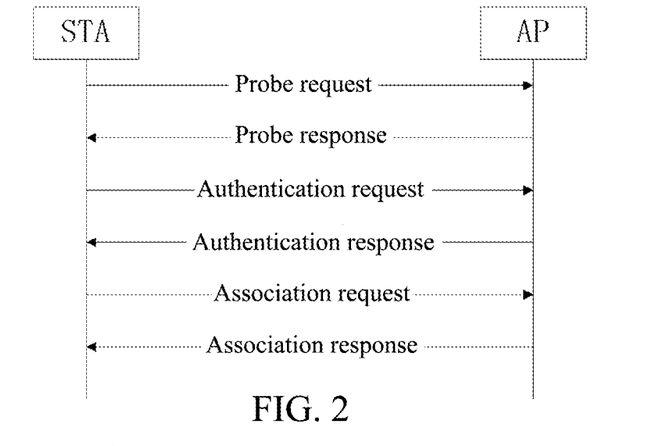
FIG. 2 is a flow diagram of establishing a connection between the STA and the AP in the related art.

As shown in FIG. 2, a flow of establishing a connection between an STA and an AP in the related art includes:

the STA broadcasting a Probe request, and the AP that receives the request replying a Probe response to the STA, wherein connection authentication information required for accessing the AP is carried in the probe response; the STA sending an authentication request to the above AP, and the AP that receives the authentication request replying an authentication response to the STA; and the STA sending an association request to the above AP, and the AP that receives the association request replying an association response to the STA.

The connection is established after successfully performing probe, authentication and association between the STA and the AP, then the STA can access the local area network via the AP. It can be seen from the flow shown in FIG. 2 that, each STA must go through multiple interactions with the AP, and then the connection between the STA and the AP can be established.

In order to promote the number of accessing STAs and guarantee a network signal condition of each STA, multiple APs may exist in certain areas. When Beacon messages sent by the multiple APs are received, the STAs will decide which AP to access according to conditions such as the signal intensity of each Beacon message and so on; after one AP is selected, the connection between the STA and the AP is established through a flow shown in FIG. 2; and if the selected AP itself is overloaded currently, a connection request of the STA may be rejected, and this way can be called the simplest AP load balancing way. However, after one AP rejects the connection request of the STA, if another STA resends the connection request, it may still select to request the AP for a connection, and it is continually rejected by the AP, thus this causes that the STA cannot access normally.

There are various schemes with regard to the load balancing between multiple APs at present, for example, a method and system for implementing load balancing between access points, an AP and a wireless mobile terminal are disclosed in the invention with an application number of 200810112355.4. The method includes: an STA collecting APs which the STA can access currently and selecting one AP of the APs as a master AP; and when receiving Load-balancing Service Set (LSS) message sent by the STA, according to a load state of each AP in the LSS message to which the AP belongs, the AP making a selection in the APs which the STA can access and informing the STA to access the selected AP. In the method, a way for deciding the load is based on simple indicators such as the AP signal quality and so on. A method for wireless load balancing and an access controller are disclosed in the invention with an application number of 200810112188.3. Wherein, the method includes: an Access Controller (AC) receiving a request of accessing one AP sent by the STA, calculating a wireless load of the AP which the STA requests to access, judging whether the wireless load meets a preset acceptance condition, if yes, accepting the request of the STA; and if no, rejecting the request of the STA. In the invention, the number of accessing STAs within the wireless local area network and the traffic of each wireless interface are considered in the judgment on the load, and a method for load detection is further improved. However, in the above method, the judgment on the AP load is only based on indicators of the AP within the wireless local area network, such as the Wireless Fidelity (Wi-Fi) signal intensity, the number of accessing STAs and the traffic of each wireless interface within the wireless local area network.

As the 3rd-generation mobile telecommunications (3G) technologies such as the Wideband Code Division Multiple Access (WCDMA) and the Evolution-Data Only (EVDO), etc. and the Long Term Evolution (LTE) technology become more and more prevalent, wireless access point products (e.g., Eufi) accessing the Internet via the 3G/4G (the 4G is the 4th-generation mobile communication technology) gradually become important components of the wireless local area network.

It can be seen from the above descriptions that the current various AP load balancing schemes have apparent defects in solving the problem of load balancing between the special APs such as the Eufi.

1. The number of STAs accessing a certain AP is considered in all common AP load balancing schemes, but the STAs currently accessing the AP are not always in a busy state, that is, the AP which a large number of STAs access does not necessarily has the maximum load, thus the number of accessing STAs cannot accurately reflect an effective load of the particular AP.

2. The Eufi-type wireless access point products access networks of the mobile operators in a wireless way, but an essential difference exists between the wireless access way and the wired way, thus an exit bandwidth of the wireless access point and a networking way between the APs are all changed, and this cannot be solved by all the current various AP load balancing schemes.

3. Since an AP controller is used in all the common AP load balancing schemes, costs of the wireless network are increased; in some other schemes, a certain AP is used as the AP controller, but when a data interaction occurs between the AP serving as the controller and other APs, undesirable phenomena such as a transient data congestion within the wireless network will be caused, and the perceptibility of the user is stronger in the condition of busy wireless network, thus the user experience is limited.

SUMMARY OF THE INVENTION

The object of the example of the present document is to provide a method for a mobile terminal accessing wireless access points and a wireless access point, to overcome a defect that the existing load balancing method is not applicable to the wireless access points.

In order to solve the above problem, the example of the present document provides a method for a mobile terminal accessing wireless access points, applied in a wireless network composed of the wireless access points, which comprises:

a first wireless access point, after acquiring an access request of a mobile station, when determining that a load of the first wireless access point itself exceeds a preset first load upper limit, according to acquired connection information of other wireless access points in the present wireless network, sending a load balance request to all the other wireless access points;

a wireless access point receiving the load balance request sending a load balance feedback message to the first wireless access point, wherein a load of itself and connection authentication information required for accessing the present wireless access point are carried in the load balance feedback message;

the first wireless access point selecting a load balance feedback message carrying a minimum load from all received load balance feedback messages, and then sending the connection authentication information carried in the selected load balance feedback message carrying the minimum load to the mobile station; and the mobile station initiating an access flow to a corresponding wireless access point according to the received connection authentication information.

Wherein, each wireless access point in the wireless network broadcasts connection information of itself to the other wireless access points via a management frame.

Wherein, the connection information of the wireless access point comprises: a service set identifier of the wireless access point, information of an adopted mobile network and a Medium Access Control (MAC) address.

Wherein, the step of the wireless access point receiving the load balance request sending the load balance feedback message to the first wireless access point comprises:

the wireless access point receiving the load balance request detecting a load state of itself, and when the load of itself does not exceed a load upper limit preset for the present wireless access point, sending the load balance feedback message to the first wireless access point.

The method further comprises:

the wireless access point receiving the load balance request detecting a load state of itself, and when determining that the load of itself exceeds the load upper limit preset for the present wireless access point, directly discarding the received load balance request.

Wherein, connection information of the mobile station is carried in the load balance request;

before the step of the wireless access point receiving the load balance request sending the load balance feedback message to the first wireless access point, the method further comprises:

the wireless access point receiving the load balance request detecting whether communication with the mobile station is able to be performed according to the received connection information of the mobile station;

the step of the wireless access point receiving the load balance request sending the load balance feedback message to the first wireless access point comprises:

after detecting that communication with the mobile station is able to be performed, the wireless access point receiving the load balance request sending the load balance feedback message to the first wireless access point.

Wherein, after sending the load balance request to all the other wireless access points, the first wireless access point starts a timer;

the step of the first wireless access point selecting the load balance feedback message carrying the minimum load from all the received load balance feedback messages comprises:

the first wireless access point selecting the load balance feedback message carrying the minimum load from all the received load balance feedback messages before the timer times out.

Wherein, timeout time information of the timer is carried in the load balance request;

the step of the wireless access point receiving the load balance request sending the load balance feedback message to the first wireless access point comprises:

after encapsulating the load balance feedback message, and when determining that a current time does not exceed the timeout time of the timer, the wireless access point receiving the load balance request sending the load balance feedback message to the first wireless access point.

Wherein, a frame structure of the management frame is obtained after extending an 802.11 MAC standard frame, in the management frame, a value of a subtype in a frame control field is an arbitrary value of 0110~0111 and 1101~1111, and a frame body field is used for carrying the connection information of the wireless access point itself.

Correspondingly, the example of the present document further provides a wireless access point, which comprises: a transceiver module, a load judgment module, a parse module and a selection module; wherein, the transceiver module is configured to: receive a probe request sent by a mobile station; after receiving a load balance command, send a load balance request to all other wireless access points according to acquired connection information of the other wireless access points in a present wireless network; after receiving load balance requests sent from the other wireless access points, send a load balance feedback message to the other wireless access points, wherein a load of itself and connection authentication information required for accessing the present wireless access point are carried in the load balance feedback message; send received load balance feedback messages sent by the other wireless access points to the parse module; and send the connection authentication information sent by the selection module to the mobile station;

the load judgment module is configured to: after the transceiver module receives the probe request, when determining that a load of itself exceeds a load upper limit preset for the present wireless access point, send the load balance command to the transceiver module;

the parse module is configured to: parse all the received load balance feedback messages; and the selection module is configured to: select a load balance feedback message carrying a minimum load from all the load balance feedback messages parsed by the parse module, and then send the connection authentication information carried in the selected load balance feedback message carrying the minimum load to the transceiver module.

Wherein, the transceiver module is further configured to: broadcast connection information of the present wireless access point to the other wireless access points via a management frame; wherein, the connection information of the wireless access point comprises: a service set identifier of the wireless access point, information of an adopted mobile network and a Medium Access Control (MAC) address.

Wherein, the load judgment module is further configured to: after the transceiver module receives the load balance request, detect a load state of itself, and when a load of itself does not exceed the load upper limit preset for the present wireless access point, send a participation load balance command to the transceiver module; and the transceiver module is further configured to: after receiving the participation load balance command, send the load balance feedback message to the other wireless access points.

Wherein, the transceiver module is further configured to: after sending the load balance request to the other wireless access points, start a timer; and the transceiver module is further configured to: receive the load balance feedback message only before the timer times out.

Wherein, timeout time information of the timer is carried in the load balance request;

the transceiver module is further configured to: after encapsulating the load balance feedback message, and when determining that a current time does not exceed the timeout time of the timer, send the load balance feedback message.

In the example of the present document, special forms of the Eufi-type wireless access points are comprehensively considered, and influence factors of loads are fully considered. Meanwhile, a communication mode in the load balancing process of the wireless access points is provided in the example of the present document, information exchange in the load balancing process is completed with the help of a traditional short message module, and with a small amount of system overheads, security of the authentication information is guaranteed on one hand, and it is ensured that the load balancing process does not influence data services of the wireless access points on the other hand, which further guarantees the quality of the wireless network effectively.

PREFERRED EMBODIMENTS OF THE INVENTION

The examples of the present document will be described in detail in combination with the accompanying drawings below. It should be noted that the examples in the present document and the characteristics in the examples can be optionally combined with each other in the condition of no conflict.

In the example, a method for a mobile terminal accessing wireless access points is applied in a wireless network composed of two or more wireless access points, and the following steps are included.

In step 10, the first wireless AP, after acquiring an access request of an STA (that is, a first wireless AP receives a probe request sent by the STA), and when determining that a load of the first wireless AP itself exceeds a preset first load upper limit, according to acquired connection information of the other wireless APs in a present wireless network, sends a load balance request to all other wireless APs respectively.

Wherein, a process of the wireless AP acquiring the connection information of the other wireless APs in the present wireless network can be implemented in the following way:

Each wireless AP in the wireless network broadcasts connection information of itself to the other wireless APs via a management frame, wherein, the connection information at least includes: a Service Set Identifier (SSID), information of the adopted mobile network (e.g., operator information) and a Medium Access Control (MAC) address; and each wireless AP in the wireless network saves the received connection information of the other wireless APs. In the example, the connection information refers to the connection.

In step 20, a wireless AP receiving the load balance request sends a load balance feedback message to the first wireless AP, wherein a load value of itself and connection authentication information required for accessing the present wireless AP are carried in the load balance feedback message.

In step 30, the first wireless AP selects a load balance feedback message carrying a minimum load value from all the received load balance feedback messages, and then sends the connection authentication information carried in the load balance feedback message carrying the minimum load value to the above STA.

In step 40, the STA initiates an access flow to a corresponding wireless AP according to the received connection authentication information.

It should be noted that, from the step 10 to the step 30, based on characteristics of the Eufi-type products, information transfer can be performed between all the wireless APs by a way of short messages. The way can be redefined according to application scenarios of the products. For example, when a wired backbone network exists between the Eufi products, the information transfer also can be performed between all the wireless APs via the wired backbone network. For another example, when sending the load balance request to the other wireless APs, the first wireless AP can broadcast the load balance request through a Beacon frame.

In order to guarantee a validity of the access, in the step 20, the wireless AP receiving the load balance request can firstly detect a load state of itself, when the load of itself does not exceed a load upper limit preset for the present wireless AP, send the load balance feedback message to the first wireless AP. When it is determined that the load of itself exceeds the load upper limit preset for the present wireless AP, it is unable to participate in the load balance for the load of itself is heavy, the received load balance request can be discarded directly, and no response is made.

In addition, before the wireless AP receiving the load balance request sends the load balance feedback message to the first wireless AP, it also can detect whether it is able to communicate with the above STA; the load balance feedback message is sent to the first wireless AP in a promise that communication can be performed between the wireless AP and the STA; and if communication cannot be performed, the received load balance request also can be discarded directly, and no response is made. In order to guarantee that other wireless APs can detect a condition of the communication with the STA, the first wireless AP can carry connection information of the STA in the load balance request sent to the other wireless APs; wherein, the connection information of the STA includes: a Service Set Identifier (SSID), information of the adopted mobile network (e.g., operator information) and an MAC address. The other wireless APs can detect whether they are able to communication with the STA according to the received connection information of the STA.

Moreover, in the step 10, after sending the load balance request to all the other wireless APs, the first wireless AP can start a timer; correspondingly, in the step 30, the first wireless AP only receives the load balance feedback message and performs corresponding processing before the timer times out, and it does not receive the load balance feedback message any more after the timer times out.

Figure 3:
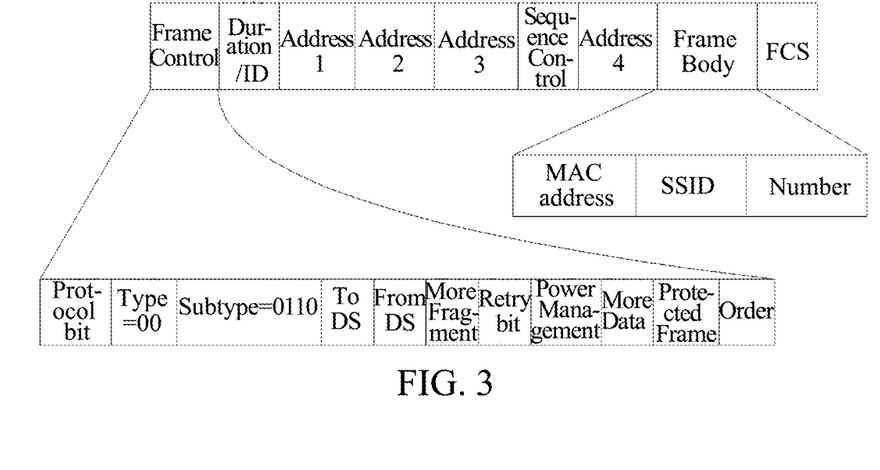
FIG. 3 is a schematic diagram of a structure of a frame for broadcasting and receiving connection information between wireless APs in the example of the present document.

As shown in FIG. 3, a frame structure of the management frame used when connection information is interacted between the wireless APs in the example is obtained by improving an 802.11 MAC standard frame, and the modified contents include:

Frame Control field: a Frame Control field of the standard frame is improved, and it can be seen from a type Type=00 of the field that the frame belongs to a management frame;

Sub Type: a Sub Type field of the standard frame is improved to constitute a special frame of the example, which is used for broadcasting connection information of the wireless AP itself, and the wireless AP receiving the special frame also can parse the special frame.

Alternatively, in the example, a Sub Type assignment is 0110. Since Sub Type values 0110~0111 and 1101~1111 of the management frame in the standard protocol are not defined, here an arbitrary value of 0110~0111 and 1101~1111 can be used so as to clarify the value from other standard values.

Frame body field: a Frame body field is a data field of the frame, and the connection information of the wireless AP itself, including information such as the MAC address, SSID and Number etc., is encapsulated in the field in the example.

Alternatively, in the example, the Number information can be set as a Mobile Directory Number (MDN) of a Subscriber Identity Module (SIM) card used by the present wireless AP.

Besides the above fields modified in the standard frame, the frame also includes the following fields.

The Frame Control field also includes: a Protocol bit, a To DS and From DS bit, a More Fragment bit, a Retry bit, a Power Management bit, a More Data bit, a Protected Frame bit and an Order bit; and a Duration/ID field, an Address1 field, an Address2 field, an Address3 field, a Sequence Control field, an Address4 field and a Frame Checking Sequence (FCS) field.

The definitions of all the above fields are consistent with the existing standard, which will not be repeated here.

The technical scheme of the present document will be further described through an application example below.

Figure 4:
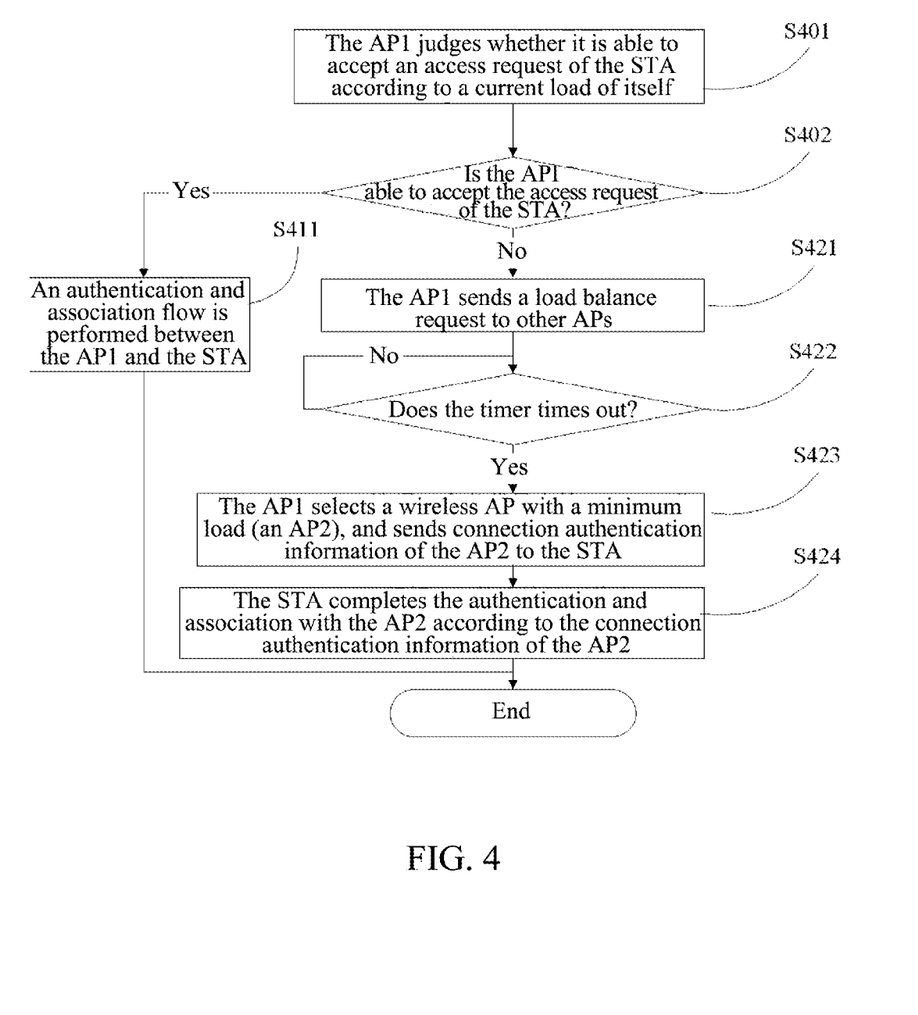
FIG. 4 is a flow diagram of the mobile terminal accessing the wireless access points in the example of the present document.

As shown in FIG. 4, a method for a mobile terminal accessing wireless access points (an AP1 is assumed in the present example), and the following steps are carried.

In step S401, after receiving an access request of an STA, the AP1 judges whether the STA can access under the current load according to a current load state of itself.

In the example, the judgment of the AP1 on the load of the AP1 itself is required to be performed in combination with the current number of accessing STAs of the present wireless AP and the current surplus bandwidth of the SIM card used by the present wireless AP. The number of accessing STAs reflects the load within the wireless network, and the current surplus bandwidth of the SIM card used by the present wireless AP reflects the load of the wireless AP accessing the Internet.

In step S402, according to a judgment result of the step S401, if the AP1 determines that the STA can perform accessing, step S411 is executed, and if the AP1 determines that the STA cannot perform accessing, step S421 is executed.

In step S411, after a follow-up authentication and association flow is performed between the AP1 and the STA, it comes to an end, and a specific flow is identical with the flow shown in FIG. 2, which will not be repeated here.

In step S421, since the STA cannot access the AP1, other wireless APs are required to participate in the load balance. The AP1 queries the saved connection information of the other APs, and reads the saved Number information corresponding to each wireless AP from the connection information. Alternatively, the Number information refers to a MDN corresponding to the SIM card used by the wireless AP in the example. Then the AP1 sends a load balance request to the MDN by short messages according to the acquired MDN.

Alternatively, the short messages can be defined as special short messages such as Class 0 short messages and so on, that is, no content is displayed when the message is delivered, and a background directly receives and parses the message.

It should be noted that, the AP1 starts a load balance feedback timer after sending the load balance request, waits for the other wireless APs to return load balance feedback messages before the timer times out, and does not receive and parse the load balance feedback messages any more after the timer times out.

In step S422, whether the timer times out is judged, if the timer times out, the load balance feedback messages are not received and parsed any more, it is to directly proceed to step S423, and if the timer does not time out, it is to wait until the timer times out.

In step S423, the AP1 extracts loads returned by the other wireless APs from the received load balance feedback messages, sequences the loads of all the wireless APs, selects a wireless AP with a minimum load (an AP2 is assumed in the example) from the loads, and sends connection authentication information of the AP2 to the above STA. Meanwhile, a load value of the AP2 also can be sent to the STA together.

It should be noted that, if the AP1 does not obtain any load balance feedback message from the other wireless APs before the timer times out, it means that no other wireless APs can participate in the load balance with respect to the AP1, thus the AP1 must make the above STA access the present AP by itself or directly reject the access request of the STA.

It should be noted that, since the management frame cannot be encrypted, and the connection authentication information of the AP2 sent by the AP1 to the above STA relates to the wireless security, which is important information, the connection authentication information of the AP2 can be preferably sent via a data frame.

In step S424, the STA receives the data frame sent from the AP1, reads the connection authentication information of the AP2 from the data frame, completes an authentication and association flow with the AP2, and then accesses the AP2. If the load value of the AP2 is contained in the data frame, the STA also can display the load value to the user, so that the user can look up the load value.

Figure 5:
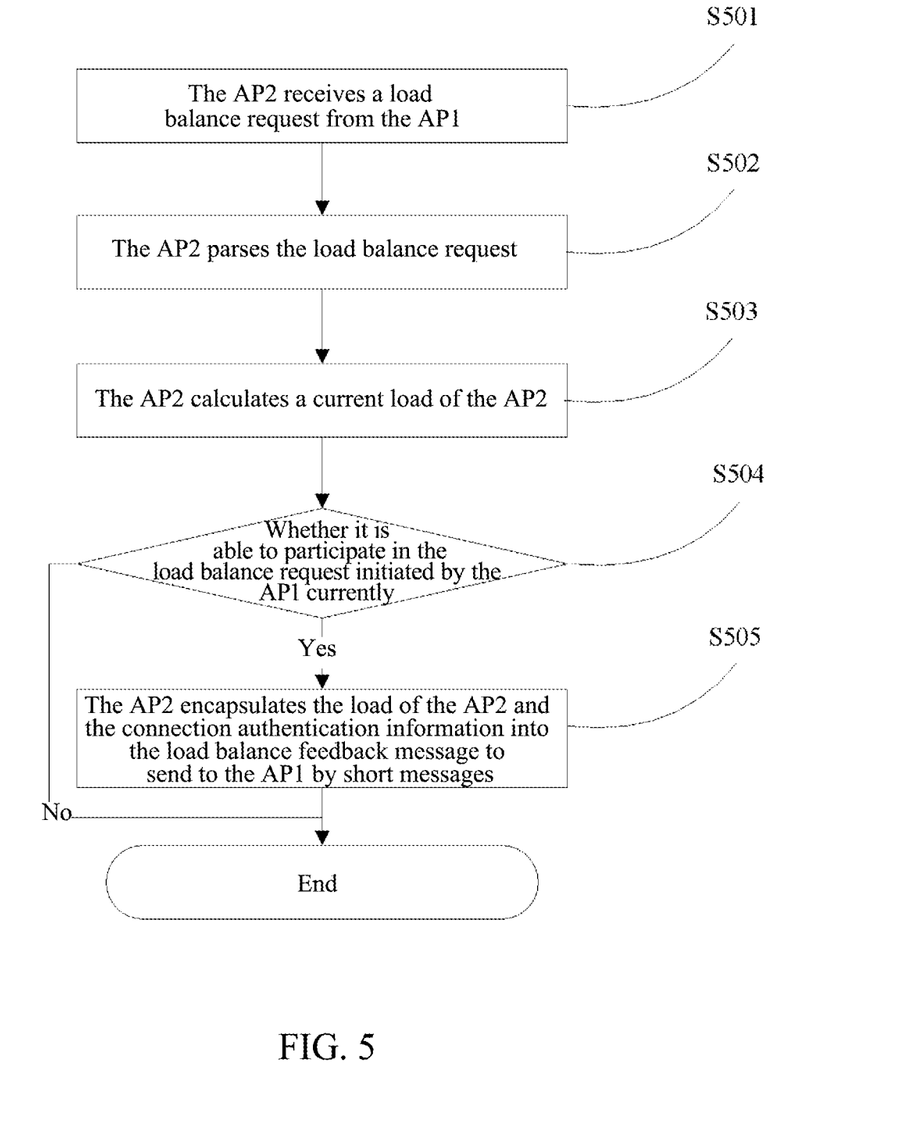
FIG. 5 is a flow diagram of the wireless access point receiving load balance request message processing the load balance request message in the example of the present document.

As shown in FIG. 5, a process of the wireless access point receiving the load balance request (with an AP2 as an example) processing the message includes the following steps.

In step 501, the AP2 receives a load balance request sent from the AP1 in the above example, wherein a timeout time value of the timer started by the AP1 is carried in the load balance request.

In step 502, the AP2 parses the load balance request, reads the timeout time value set by the AP1 from the load balance request, and starts a timer of the AP2 itself based on the timeout time value.

In step 503, the AP2 calculates a current load of the AP2 itself.

Alternatively, in the example, the judgment of the AP2 on the load of the AP2 itself is required to be performed in combination with the current number of accessing STAs of the AP2 and the current surplus bandwidth of the SIM card used by the present wireless AP. The number of accessing STAs reflects the load within the wireless network, and the current surplus bandwidth of the SIM card used by the present wireless AP reflects the load of the wireless AP accessing the Internet.

In step 504, the AP2 determines whether it is able to participate in the load balance initiated by the AP1 currently according to a calculation result of the step S503 (that is, it is judged whether a current load value of the AP2 exceeds a load upper limit preset for the present wireless AP), if it is able to participate in the load balance, step S505 is executed, and if it is unable to participate in the load balance, no operation is carried out, and the received load balance request is discarded.

In step 505, if the timer does not time out, the AP2 encapsulates the connection authentication information of the AP2 and the current load value into the load balance feedback message to send to the AP1 by short messages; and if the timer times out, it does not perform the follow-up processing anymore, and the flow ends.

Alternatively, the short messages can be defined as special short messages such as Class 0 short message and so on, that is, no content is displayed when the message is delivered, and the messages are received and parsed in the background.

Alternatively, the connection authentication information includes an SSID of the present AP, an encryption mode and passwords and so on. Since the authentication information relates to the security, the security can be better guaranteed by the way of sending short messages.

Figure 6:
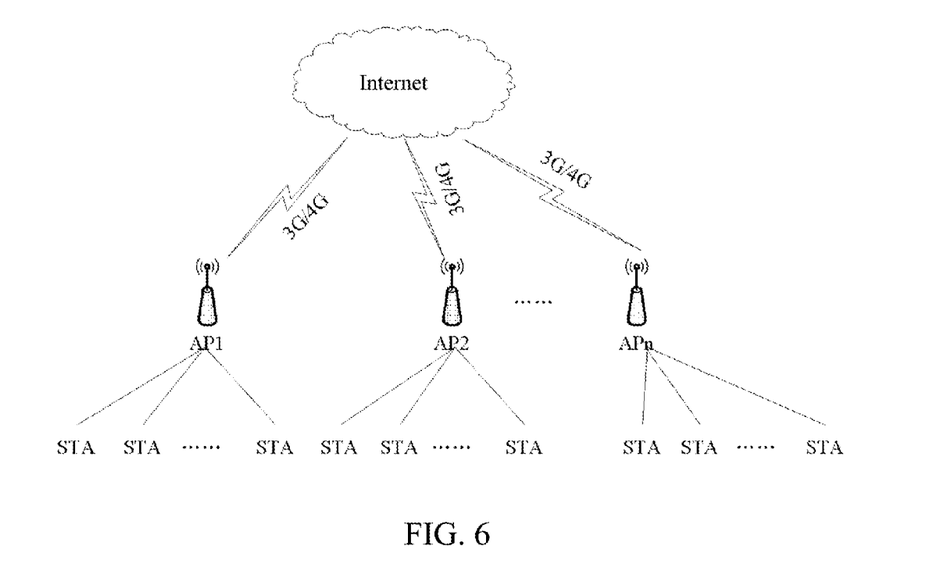
FIG. 6 is a schematic diagram of a composition of a system for the mobile terminal accessing the wireless access points in the example of the present document.

As shown in FIG. 6, a system for a mobile terminal accessing wireless access points includes:

wireless APs (AP1, AP2, . . . , APn), which constitute an AP set, complete the load balance together, and provide access services for the STA; and mobile terminals, which can send an access request to the wireless APs, parse data frames of the APs, and extract authentication information with regard to a particular AP from the data frames and access the wireless AP according to the authentication information.

Figure 7:
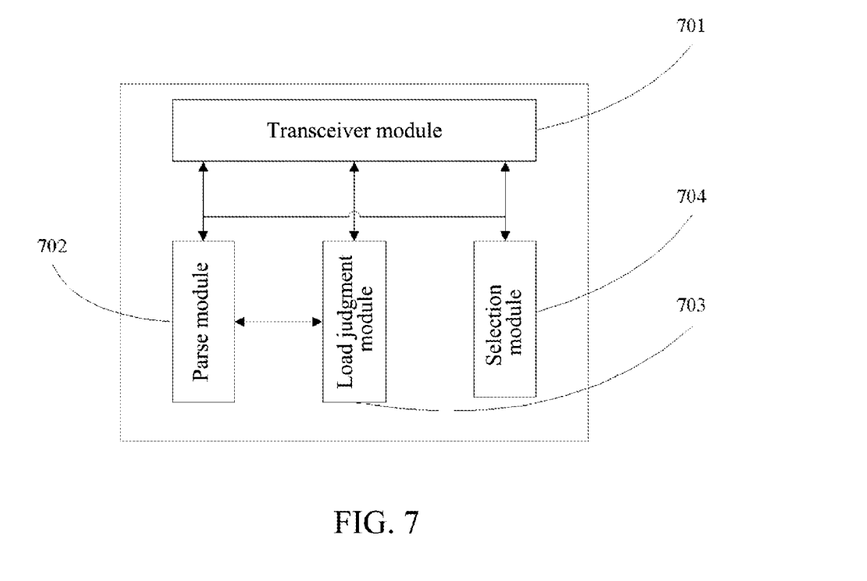
FIG. 7 is a schematic diagram of a structure of the wireless access point in the example of the present document.

As shown in FIG. 7, the wireless access point includes: a transceiver module 701, a parse module 702, a load judgment module 703 and a selection module 704; wherein, the transceiver module 701 is configured to: receive a probe request sent by a mobile station; after receiving a load balance command, according to the acquired connection information of the other wireless access points in the present wireless network, send a load balance request to all other wireless access points; after receiving the load balance request sent from the other wireless access points, send load balance feedback message to the other wireless access points, wherein a load value of itself and connection authentication information required for accessing the present wireless access point are carried in the load balance feedback message; send the received load balance feedback messages sent by the other wireless access points to the parse module 702; and send connection authentication information sent by the selection module 704 to the mobile station;

the parse module 702 is configured to: parse all the received load balance feedback messages; and the load judgment module 703 is configured to: after the transceiver module 701 receives the probe request, when determining that a load of itself exceeds a load upper limit preset for the present wireless access point, send the load balance command to the transceiver module 701.

Alternatively, in the embodiment, the judgment on the load of the wireless AP is performed in combination with the current number of accessing STAs of the wireless AP and the current surplus bandwidth of the SIM card used by the wireless AP. The number of accessing STAs reflects the load within the wireless network, and the current surplus bandwidth of the SIM card used by the wireless AP reflects the load of the wireless AP accessing the Internet.

The selection module 704 is configured to: select load balance feedback message carrying a minimum load value from all the load balance feedback messages parsed by the parse module 702, and then send the connection authentication information carried in the selected load balance feedback message carrying the minimum load value to the transceiver module 701.

Preferably, the transceiver module 701 is further configured to: broadcast connection information of the present wireless access point to the other wireless access points via a management frame; wherein, the connection information of the wireless access point includes: a service set identifier of the wireless access point, information of an adopted mobile network and a Medium Access Control (MAC) address.

Preferably, the load judgment module 703 is further configured to: after the transceiver module 701 receives the load balance request, detect a load state of itself, and when a load of itself does not exceed the load upper limit preset for the present wireless access point, send a participation load balance command to the transceiver module 701; and the transceiver module 701 is further configured to: after receiving the participation load balance command, send the load balance feedback message to the other wireless access points.

Preferably, the transceiver module 701 is further configured to: after sending the load balance request to the other wireless access points, start a timer; and the transceiver module 701 is further configured to: only receive the load balance feedback message before the timer times out.

Preferably, timeout time information of the timer is carried in the load balance request;

the transceiver module 701 is further configured to: after encapsulating the load balance feedback message, and when determining that a current time does not exceed a timeout time of the timer, send the load balance feedback message.

It should be noted that, besides the modules referred in the examples, the wireless access points referred in the examples of the present document also include other elements well known by the skilled in the art, in order to highlight the invention idea of the present present document, only the modules related to the invention idea of the present document are described in the example of the present document, and the other well-known elements in the wireless access points are not repeated.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The example of the present document is not limited to any combination of hardware and software in a specific form.

The above description is only for the preferred examples of the present document, which is not used to limit the protection scope of the present document. According to the summary of the invention of the present do document, there still can be other various examples, the skilled familiar to the art can make various corresponding changes and transformations according to the examples of the present document without departing from the spirit and essence of the present document, and all the modifications, equivalent substitutions, and improvements, etc. made within the spirit and principle of the present document shall fall into the protection scope of the present document.

INDUSTRIAL APPLICABILITY

In the example of the present document, special forms of the Eufi-type wireless access points are comprehensively considered, and influence factors of the load are fully considered; meanwhile, a communication mode in the load balancing process of the wireless access points is provided, information exchange in the load balancing process is completed with the help of a traditional short message module, and with a small amount of system overheads, security of the authentication information is guaranteed on one hand, and it is ensured that the load balancing process does not influence data services of the wireless access points on the other hand, which further guarantees the quality of the wireless network effectively.

What is claimed is:

1. A method for a mobile terminal accessing wireless access points, applied in a wireless network composed of the wireless access points, comprising:
   a first wireless access point, after acquiring an access request of a mobile station, and when determining that a load of the first wireless access point itself exceeds a preset first load upper limit, according to acquired connection information of other wireless access points in the present wireless network, sending a load balance request to all the other wireless access points;
   a wireless access point receiving the load balance request sending a load balance feedback message to the first wireless access point, wherein a load of the wireless access point itself and connection authentication information required for accessing the present wireless access point are carried in the load balance feedback message;
   the first wireless access point selecting a load balance feedback message carrying a minimum load from all received load balance feedback messages, and then sending the connection authentication information carried in the selected load balance feedback message carrying the minimum load to the mobile station; and
   the mobile station initiating an access flow to a corresponding wireless access point according to the received connection authentication information.

2. The method according to claim 1, further comprising:
each wireless access point in the wireless network broadcasting connection information of itself to the other wireless access points via a management frame.

3. The method according to claim 2, wherein:
a frame structure of the management frame is obtained after extending an 802.11 MAC standard frame, in the management frame,
a value of a subtype in a frame control field is an arbitrary value of 0110~0111 and 1101~1111, and a frame body field is used for carrying the connection information of the wireless access point itself.

4. The method according to claim 2, wherein:
the connection information of the wireless access point comprises: a service set identifier of the wireless access point, information of an adopted mobile network and a Medium Access Control (MAC) address.

5. The method according to claim 1, wherein:
the connection information of the wireless access point comprises: a service set identifier of the wireless access point, information of an adopted mobile network and a Medium Access Control (MAC) address.

6. The method according to claim 1, wherein:
the step of the wireless access point receiving the load balance request sending the load balance feedback message to the first wireless access point comprises:
the wireless access point receiving the load balance request detecting a load state of itself, and when the load of the wireless access point itself does not exceed a load upper limit preset for the present wireless access point, sending the load balance feedback message to the first wireless access point.

7. The method according to claim 6, further comprising:
the wireless access point receiving the load balance request detecting a load state of itself, and when determining that the load of the wireless access point itself exceeds the load upper limit preset for the present wireless access point, directly discarding the received load balance request.

8. The method according to claim 7, wherein:
connection information of the mobile station is carried in the load balance request;
before the step of the wireless access point receiving the load balance request sending the load balance feedback message to the first wireless access point, the method further comprises:
the wireless access point receiving the load balance request detecting whether communication with the mobile station is able to be performed according to the received connection information of the mobile station;
the step of the wireless access point receiving the load balance request sending the load balance feedback message to the first wireless access point comprises:
after detecting that communication with the mobile station is able to be performed, the wireless access point receiving the load balance request sending the load balance feedback message to the first wireless access point.

9. The method according to claim 7, wherein:
after sending the load balance request to all the other wireless access points, the first wireless access point starts a timer;
the step of the first wireless access point selecting the load balance feedback message carrying the minimum load from all the received load balance feedback messages comprises:
the first wireless access point selecting the load balance feedback message carrying the minimum load from all the received load balance feedback messages before the timer times out.

10. The method according to claim 6, wherein:
connection information of the mobile station is carried in the load balance request;
before the step of the wireless access point receiving the load balance request sending the load balance feedback message to the first wireless access point, the method further comprises:
the wireless access point receiving the load balance request detecting whether communication with the mobile station is able to be performed according to the received connection information of the mobile station;
the step of the wireless access point receiving the load balance request sending the load balance feedback message to the first wireless access point comprises:
after detecting that communication with the mobile station is able to be performed, the wireless access point receiving the load balance request sending the load balance feedback message to the first wireless access point.

11. The method according to claim 6, wherein:
after sending the load balance request to all the other wireless access points, the first wireless access point starts a timer;
the step of the first wireless access point selecting the load balance feedback message carrying the minimum load from all the received load balance feedback messages comprises:
the first wireless access point selecting the load balance feedback message carrying the minimum load from all the received load balance feedback messages before the timer times out.

12. The method according to claim 1, wherein:
connection information of the mobile station is carried in the load balance request;
before the step of the wireless access point receiving the load balance request sending the load balance feedback message to the first wireless access point, the method further comprises:
the wireless access point receiving the load balance request detecting whether communication with the mobile station is able to be performed according to the received connection information of the mobile station;
the step of the wireless access point receiving the load balance request sending the load balance feedback message to the first wireless access point comprises:
after detecting that communication with the mobile station is able to be performed, the wireless access point receiving the load balance request sending the load balance feedback message to the first wireless access point.

13. The method according to claim 1, wherein:
after sending the load balance request to all the other wireless access points, the first wireless access point starts a timer;
the step of the first wireless access point selecting the load balance feedback message carrying the minimum load from all the received load balance feedback messages comprises:
the first wireless access point selecting the load balance feedback message carrying the minimum load from all the received load balance feedback messages before the timer times out.

14. The method according to claim 13, wherein:
timeout time information of the timer is carried in the load balance request;
the step of the wireless access point receiving the load balance request sending the load balance feedback message to the first wireless access point comprises:
after encapsulating the load balance feedback message, and when determining that a current time does not exceed the timeout time of the timer, the wireless access point receiving the load balance request sending the load balance feedback message to the first wireless access point.

15. A wireless access point, comprising: a transceiver module, a load judgment module, a parse module and a selection module; wherein,
the transceiver module is configured to: receive a probe request sent by a mobile station; after receiving a load balance command, send a load balance request to all other wireless access points according to acquired connection information of the other wireless access points in a present wireless network; after receiving load balance requests sent from the other wireless access points, send a load balance feedback message to the other wireless access points, wherein a load of the wireless access point itself and connection authentication information required for accessing the present wireless access point are carried in the load balance feedback message; send received load balance feedback messages sent by the other wireless access points to the parse module; and send the connection authentication information sent by the selection module to the mobile station;
the load judgment module is configured to: after the transceiver module receives the probe request, when determining that a load of the wireless access point itself exceeds a load upper limit preset for the present wireless access point, send the load balance command to the transceiver module;
the parse module is configured to: parse all the received load balance feedback messages; and
the selection module is configured to: select a load balance feedback message carrying a minimum load from all the load balance feedback messages parsed by the parse module, and then send the connection authentication information carried in the selected load balance feedback message carrying the minimum load to the transceiver module.

16. The wireless access point according to claim 15, wherein:
the transceiver module is further configured to: broadcast connection information of the present wireless access point to the other wireless access points via a management frame; wherein, the connection information of the wireless access point comprises: a service set identifier of the wireless access point, information of an adopted mobile network and a Medium Access Control (MAC) address.

17. The wireless access point according to claim 15, wherein:
- the load judgment module is further configured to: after the transceiver module receives the load balance request, detect a load state of the wireless access point itself, and when the load of the wireless access point itself does not exceed the load upper limit preset for the present wireless access point, send a participation load balance command to the transceiver module; and
- the transceiver module is further configured to: after receiving the participation load balance command, send the load balance feedback message to the other wireless access points.

18. The wireless access point according to claim 17, wherein:
- the transceiver module is further configured to: after sending the load balance request to the other wireless access points, start a timer; and
- the transceiver module is further configured to: only receive the load balance feedback message before the timer times out.

19. The wireless access point according to claim 15, wherein:
- the transceiver module is further configured to: after sending the load balance request to the other wireless access points, start a timer; and
- the transceiver module is further configured to: only receive the load balance feedback message before the timer times out.

20. The wireless access point according to claim 19, wherein:
- timeout time information of the timer is carried in the load balance request;
- the transceiver module is further configured to: after encapsulating the load balance feedback message, and when determining that a current time does not exceed the timeout time of the timer, send the load balance feedback message.

\* \* \* \* \*